United States Patent [19]

Yang

[11] Patent Number: 4,933,800
[45] Date of Patent: Jun. 12, 1990

[54] MOTOR OVERLOAD DETECTION WITH PREDETERMINED ROTATION REVERSAL

[76] Inventor: Tai-Her Yang, 5-1 Taipin Street, Si-Hu Town, Taiwan

[21] Appl. No.: 354,453

[22] Filed: May 19, 1989

Related U.S. Application Data

[63] Continuation-in-part of Ser. No. 201,847, Jun. 3, 1988, abandoned.

[51] Int. Cl.⁵ .............................................. H02H 5/00
[52] U.S. Cl. ......................................... 361/29; 361/55
[58] Field of Search ...................... 361/23, 28, 29, 59, 361/93, 94; 207/116, 119, 131

[56] References Cited

U.S. PATENT DOCUMENTS 4,412,162 10/1983 Hitamura ........................... 361/29 X Primary Examiner—Derek S. Jennings
Attorney, Agent, or Firm—Leonard Bloom

[57] ABSTRACT

An apparatus is provided for controlling an electric motor that is doing some sort of work, whereby the apparatus automatically senses the presence of a work overload. Once the work overload is sensed, the apparatus automatically reverses the direction of rotation of the motor to eliminate the work overload. The reversed rotation is limited to either a predetermined period of time or to a predetermined number of reverse rotations. Once the predetermined limit of reverse rotation is reached, the apparatus automatically resumes normal rotation of the motor.

12 Claims, 1 Drawing Sheet

MOTOR OVERLOAD DETECTION WITH PREDETERMINED ROTATION REVERSAL

CROSS-REFERENCE TO CO-PENDING APPLICATION

This application is a continuation-in-part of application Ser. No. 201,847 filed June 3, 1988, now abandoned and entitled "Machinery Equipment and Circuit With Overload Detection Timing or Quantitative Reversal Driving Control", the disclosure of which is incorporated herein in its entirety by reference.

FIELD OF THE INVENTION

The present invention relates to the field of automatic control of electrical motors, and more particularly to an apparatus for automatically responding to a work overload. More specifically, the invention relates to an apparatus for sensing the presence of a work overload, reversing normal drive motor rotation to remove the cause of the overload, and resuming normal operation of the drive motor, after overload elimination.

BACKGROUND OF THE INVENTION

In the art of conventional hand-held drills, stationary drills, tapping machines, or other kinds of machines used for boring holes in work products, when chips resulting from the boring process accumulate, the load on the driving motor may increase to the extent that an overload on the driving motor results. It would be desirable, however, that when the work load is increased to a predetermined level, that is a predetermined overload level, the drive motor would reverse its direction of rotation so that the cause of the overload, e.g. the chips, could be eliminated, e.g. the chips discharged. Once the chips would be discharged, the drive motor could automatically reverse direction again to restore the normal boring operation.

Aside from boring operations, other operations, such as mixing, crushing, and article washing operations, are subject to the onset of an overload condition on the drive motor due to undesired binding of the articles. Similarly, the overload and binding condition may be relieved by an automatic reversal of the direction of rotation of the drive motor. The reversed rotation serves to undo the binding. Once the binding is undone, the drive motor can reverse direction again to resume normal operations of the drive motor.

More specifically, the prior art discloses U.S. Pat. No. 4,412,162 in which a protective system for preventing damage to a work tool is provided during a tool changing operation in an automatic tool changing apparatus in a numerical control machine tool. The protective system monitors the load current of the driving motor for the automatic tool changing apparatus. When the load current reaches an abnormally high current value during the operating period, excluding the motor starting period, the operation of the automatic tool changing apparatus is reversed and then stopped. It would be desirable, however, if an apparatus were provided which could automatically remove a work overload and then automatically resume normal operations.

SUMMARY OF THE INVENTION

Accordingly, it is a primary object of the present invention to provide an apparatus that automatically reverses the direction of rotation of a motor when a work overload occurs thereby eliminating the cause of the overload and that automatically resumes the normal direction of rotation after the work overload is eliminated.

In accordance with principles of the invention, an apparatus is provided for an electric motor that is doing some sort of work. The apparatus automatically senses the presence of a work overload, automatically reverses the direction of rotation of the motor to eliminate the work overload, and automatically resumes normal rotation of the motor after the rotation reversal to eliminate the work overload has taken place. Once the direction of rotation of the motor is reversed, either a timer begins to run or a reverse rotation counter counts the amount of reverse rotation that takes place or a load position detector detects the amount of reverse movement of the load due to reverse rotation. Once either a predetermined time interval of reverse rotation or a predetermined number of reverse rotations have taken place or a predetermined reverse position of the load is detected, the apparatus of the invention automatically restores the direction of motor rotation to the normal direction.

These and other objects and advantages of the present invention will become apparent from a reading of the following specification, taken in conjunction with the enclosed drawings.

DESCRIPTION OF THE PREFERRED EMBODIMENT

Figure 1:
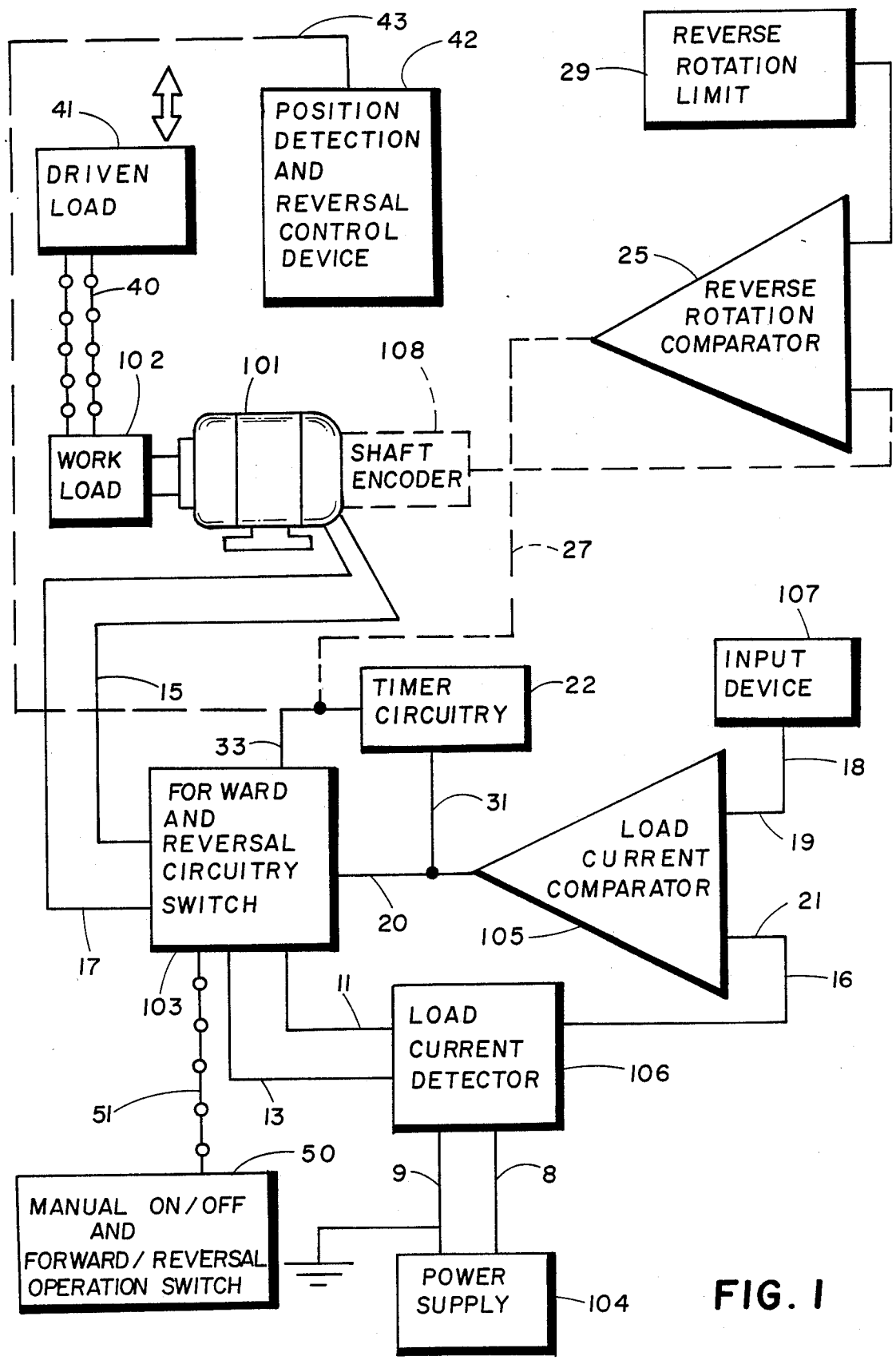
FIG. 1 shows a schematic diagram of one embodiment of the motor control apparatus of the invention.

With reference to FIG. 1, there is disclosed a preferred embodiment of the motor control apparatus of the present invention. In the illustrated embodiment, power supply 104 may be either an AC or DC power supply which supplies electrical power through line 8 and ground line 9 to drive the driving motor 101 in either direction through lines 11, 13, 15 and 17. The actual direction of the power supplied to the driving motor 101 is controlled by forward and reversal circuitry switch 103.

Forward and reversal switch circuitry 103 may include any suitable means for reversing the polarity of current used to drive the driving motor 101 which may be an AC or DC powered motor. The forward and reversal switch circuitry 103 preferably also includes RC circuit elements that permit the motor that rotates in one direction to come to a complete stop before the motor is caused to rotate in the opposite direction. Often, however, the work overload is so severe that the motor comes to a complete stop due to the work overload.

More specifically, forward and reversal switch circuitry 103 may include a DC powered double-pole, double-throw relay (not shown) which is driven by a DC powered resettable flip-flop (not shown). When the flip-flop is set, the double-pole, double-throw relay is locked into a first throw position which supplies a first polarity of drive current to the driving motor 101. Alternatively, when the flip-flop is reversed, the double-pole, double-throw relay is driven to a second throw position which supplies a second and reversed polarity of drive current to the driving motor 101.

The status of the flip-flop in the forward and reversal switch circuitry 103 is controlled by the output from DC powered load comparator circuitry 105, which in turn is controlled by the relative DC values on the reference input 19 and the sampling input 21. More specifically, the voltage inputted at the sampling input 21 comes from a load current detector 106 which senses the current load (AC or DC) used to drive the driving motor 101. If the voltage inputted at the sampling input 21 coming from the load current detector 106 is less than the reference voltage at input 19, the condition of the apparatus is "normal", and the output from the load comparator circuitry 105 is high (or low depending on the convention employed). In such a case, for example, the flip-flop in the forward and reversal switch circuitry 103 is in the "normal" status; the status of the double-pole, double-throw relay in the forward and reversal switch circuitry 103 is "normal"; and the direction of rotation of the driving motor 101 is in the "normal" direction.

On the other hand, if the input voltage to input terminal 21 from the DC powered load current detector 106 exceeds the reference voltage at reference input 19, the output from the load comparator circuitry 105 would be low, thereby changing the status of the flip-flop from normal to "reverse" status. Similarly, after permitting the motor to come to a complete stop, the double-pole, double-throw relay in the rotation direction reversal switch circuitry 103 would be changed to "reverse" status, whereby the polarity of the power flowing to the driving motor 101 would be "reversed", and the driving motor 101 would rotate in the "reverse" direction.

DC powered input device 107 provides a predetermined reference current load value along line 18 to load comparator circuitry 105. The input device 107 may be a keyboard, an analog-to-digital converter, or any other suitable device for setting a reference voltage at the reference input 19 of the load comparator 105.

More specifically, as the work load 102 increases, the electrical current load in the driving motor 101 will also increase; and a signal representing the measured current load from detection circuitry 106 on line 16 will also increase. When the measured current load value on line 16 exceeds the predetermined current load value appearing on line 18, a current overload condition in the driving motor 101 exists. Upon sensing the current overload condition, DC powered load comparator circuitry 105 sends a signal along line 20 to the DC powered forward and reversal switch circuitry 103. The forward and reversal switch circuitry 103, after the motor stops rotating, then reverses the polarity of the current flowing to the driving motor 101 thereby reversing the direction of rotation of the motor.

Once the direction of rotation of the driving motor 101 is reversed, one of three alternative means are employed to limit the amount of reverse rotation and to resume the normal direction of rotation. In the preferred embodiment, when the load comparator circuitry 105 switches from the normal to the reverse condition, a DC powered timer 22 is actuated by a signal from the output of the load current comparator 105 along line 31. Timer 22 runs for a predetermined length of time. When the predetermined length of time is concluded, the timer 22 then signals the forward and reversal switch circuitry 103 on line 33, thereby returning the switch dircuitry 103 to the normal position, whereby the driving motor 101 rotates in the normal direction once again.

Alternatively, once the direction of rotation of the driving motor 101 is reversed, a DC signaling rotary shaft encoder 108 or the like may be used to measure the amount of reverse rotation that takes place in the driving motor 101. When the measured reverse rotation reaches a predetermined reverse rotation amount, the reverse rotation is itself reversed to resume the normal direction of rotation. More specifically, the rotary shaft encoder 108 may provide a voltage to the input of a second DC powered reverse rotation comparator 25 which receives a reference voltage from a reverse rotation limit device 29 representing a predetermined degree of reverse rotation. When the measured reverse rotation reaches the predetermined reference reverse rotation, the reverse rotation comparator 25 sends a signal along line 27 to forward and reversal switch circuitry 103, and the direction of rotation of the driving motor 101 is reversed back to the normal direction of rotation.

With yet another alternative, once a driven load device 41 is moved a predetermined distance in the reverse direction by transmission device 40, as indicated by a position detector and reversal control device 42, a reverse positioning signal is generated on line 43, and the forward and reversal circuitry switch 103 will be switched back to the forward direction by the reverse positioning signal on line 43 from device 42. It is noted that the mechanical connection between work load 102 and driven load 41 is depicted by alternating circles and dashes. The transmission device may include conventional transmission devices such as a screw, cylinder, gear, rack, or steel tape.

The driving motor 101 may be an AC or DC motor. The driving motor 101 must be capable of driving the load 102 in either direction, that is, either clockwise or counterclockwise. The load 102 may be any of a variety of loads such as including, but not limited to, a workpiece being bored, a mixture being mixed, material being crushed, material being pressed, or a load of laundry being agitated.

As shown in FIG. 1, a manual on/off and forward-/reversal operation switch 50 may be provided. This manual switch 50 is connected to the forward and reversal circuitry switch 103 through mechanical linkage 51 shown by alternating circles and dashes. This manual switch 50 can be used to take the place of or manually override the operation of the forward and reversal circuitry switch 103.

When the apparatus of the invention is used to drive a hand-held motorized anvil, tapping, or drilling tool, when a work overload occurs due to improper operation of the tool or due to problems with the workpiece, the motor driving the tool will automatically stop, automatically reverse its direction of rotation for either a predetermined period of time or a predetermined number of reverse rotations or a predetermined distance to eliminate the work overload problem, and then automatically resume normal rotation.

The same sequence of steps will take place in the case of an overload due to a motorized mixing operation, a motorized crushing operation, a motorized pressing operation, and a motorized laundry washing machine. The same sequence of steps will take place whether the overload merely causes the motor to slow down or to come to a complete stop due to the work overload.

Obviously, many modifications may be made without departing from the basic spirit of the present invention. For example, a microprocessor can be used to process signals representing load current detected and predetermined reference signals. Similarly, the microprocessor can be used for counting and comparing measured time intervals of reversed rotation with predetermined time for reversed rotation. Also, the microprocessor can be used to count the number of reverse rotations that take place and compare that number of a predetermined number of reverse rotations before reinstitution of the normal direction of rotation. The microprocessor can be used to provide a suitable delay time for the motor to come to a complete stop before the direction of the motor rotation is reversed. Accordingly, it will be appreciated by those skilled in the art that within the scope of the appended claims, the invention may be practiced other than has been specifically described herein.

What is claimed is:

1. An apparatus for reversing the direction of rotation of a motor from normal operation and for restoring the normal direction of rotation, comprising:

means for detecting current load utilized by the motor during normal rotation, means for comparing the current load utilized by the motor during normal rotation with a predetermined current load utilization level representative of a work overload, means, responsive to said current load comparing means, for automatically reversing the direction of motor rotation when the current load utilized by the motor during normal rotation exceeds the predetermined current load utilization level, reverse rotation serving to eliminate the work overload, means for automatically limiting the amount of reverse rotation of the motor, said motor reversing means being responsive to said reverse rotation limiting means, whereby said motor reversing means are automatically restored to normal operation in response to said reverse rotation limiting means, whereby the motor is automatically restored to rotate in the normal direction of rotation.

2. The apparatus described in claim 1, wherein said reverse rotation limiting means include means for timing a predetermined length of time for permitting reverse rotation, whereby said means for reversing direction of motor rotation are responsive to said timing means.

3. The apparatus described in claim 1, wherein said reverse rotation limiting means include means for providing a measurement signal representative of the amount of reverse rotation, means for providing a reference signal representative of a predetermined amount of reverse rotation, and means for providing a comparison signal representing a difference between said measurement signal and said reference signal, whereby said means for reversing direction of motor rotation are responsive to said comparison signal.

4. The apparatus described in claim 1, wherein said reverse rotation limiting means include means for providing a signal representative of the amount of reverse positioning of a driven load, whereby said means for reversing direction of motor rotation are responsive to said reverse positioning signal.

5. The apparatus described in claim 1, wherein the motor is a DC motor.

6. The apparatus described in claim 1, wherein the motor is an AC motor.

7. An apparatus for reversing the normal direction of DC motor rotation when the motor encounters a work overload and for restoring the normal direction of rotation after the work overload is eliminated, comprising:

means for monitoring DC current load utilized by the motor during normal rotation, means for comparing the current load utilized by the motor during normal rotation with a predetermined current load utilization level representative of a work overload, means, responsive to said current load comparing means, for automatically reversing the direction of motor rotation when the current load utilized by the motor during normal rotation exceeds the predetermined current load utilization level, reverse rotation serving to eliminate the work overload, means for automatically limiting the amount of reverse rotation of the motor including means for providing a measurement signal representative of the amount of reverse rotation, means for providing a reference signal representative of a predetermined amount of reverse rotation, and means for providing a comparison signal representing a difference between said measurement signal and said reference signal, whereby said means for reversing direction of motor rotation are responsive to said comparison signal for automatically restoring the motor to rotate in the normal direction of rotation.

8. An apparatus for reversing the direction of rotation of a DC motor from normal operation when encountering a work overload and for restoring the normal direction of rotation when the work overload is eliminated, comprising:

means for monitoring DC current load utilized by the motor during normal rotation, means for comparing the current load utilized by the motor during normal rotation with a predetermined current load utilization level representative of a work overload, means, responsive to said current load comparing means, for automatically reversing the direction of motor rotation when the current load utilized by the motor during normal rotation exceeds the predetermined current load utilization level, the reverse rotation serving to eliminate the work overload, means for automatically limiting the amount of reverse rotation of the motor, said motor rotation reversing means being responsive to said limiting means, said limiting means including means for timing a predetermined length of time of reverse rotation whereby the motor is automatically restored to rotate in the normal direction after the expiration of said predetermined length of time.

9. An apparatus for reversing the normal direction of DC motor rotation when the motor encounters a work overload and for restoring the normal direction of rotation after the work overload is eliminated, comprising:

means for monitoring DC current load utilized by the motor during normal rotation, means for comparing the current load utilized by the motor during normal rotation with a predetermined current load utilization level representative of a work overload, means, responsive to said current load comparing means, for automatically reversing the direction of motor rotation when the current load utilized by the motor during normal rotation exceeds the predetermined current load utilization level, reverse rotation serving to eliminate the work overload, means for automatically limiting the amount of reverse rotation of the motor including means for providing a signal representative of a predetermined amount of reverse positioning of a driven load, said means for reversing direction of motor rotation being responsive to said reverse positioning signal, whereby the motor is automatically restored to rotate in the normal direction after said predetermined amount of reverse positioning.

10. An apparatus for reversing the normal direction of AC motor rotation when the motor encounters a work overload and for restoring the normal direction of rotation after the work overload is eliminated, comprising:

means for monitoring AC current load utilized by the motor during normal rotation, means for comparing the current load utilized by the motor during normal rotation with a predetermined current load utilization level representative of a work overload, means, responsive to said current load comparing means, for automatically reversing the direction of motor rotation when the current load utilized by the motor during normal rotation exceeds the predetermined current load utilization level, reverse rotation serving to eliminate the work overload, means for automatically limiting the amount of reverse rotation of the motor including: means for providing a measurement signal representative of the amount of reverse rotation, means for providing a reference signal representative of a predetermined amount of reverse rotation, and means for providing a comparison signal representing a difference between said measurement signal and said reference signal, said means for reversing direction of motor rotation being responsive to said comparison signal whereby the motor is automatically restored to rotate in the normal direction of rotation after said predetermined amount of reverse rotation.

11. An apparatus for reversing the direction of rotation of an AC motor from normal operation when encountering a work overload and for restoring the normal direction of rotation when the work overload is eliminated, comprising:

means for monitoring AC current load utilized by the motor during normal rotation, means for comparing the current load utilized by the motor during normal rotation with a predetermined current load utilization level representative of a work overload, means, responsive to said current load comparing means, for automatically reversing the direction of motor rotation when the current load utilized by the motor during normal rotation exceeds the predetermined current load utilization level, the reverse rotation serving to eliminate the work overload, means for automatically limiting the amount of reverse rotation of the motor, said limiting means including means for timing a predetermined length of time of reverse rotation, whereby the motor is automatically restored to operate in the normal direction of rotation after the expiration of said predetermined length of time.

12. An apparatus for reversing the normal direction of AC motor rotation when the motor encounters a work overload and for restoring the normal direction of rotation after the work overload is eliminated, comprising:

means for monitoring AC current load utilized by the motor during normal rotation, means for comparing the current load utilized by the motor during normal rotation with a predetermined current load utilization level representative of a work overload, means, responsive to said current load comparing means, for automatically reversing the direction of motor rotation when the current load utilized by the motor during normal rotation exceeds the predetermined current load utilization level, reverse rotation serving to eliminate the work overload, means for automatically limiting the amount of reverse rotation of the motor including means for providing a signal representative of a predetermined amount of reverse positioning of a driven load, said means for reversing direction of motor rotation being responsive to said reverse positioning signal, whereby the motor is automatically restored to rotate in the normal direction of rotation after said predetermined amount of reverse positioning.

* * * * *